(12) United States Patent
Won et al.

(10) Patent No.: US 11,563,659 B2
(45) Date of Patent: Jan. 24, 2023

(54) EDGE ALERT COORDINATOR FOR MOBILE DEVICES

(71) Applicant: VMware, Inc., Palo Alto, CA (US)

(72) Inventors: Jong Ho Won, Palo Alto, CA (US); Karen Brems, Redwood, CA (US); Hui Xu, Palo Alto, CA (US); Qiuxi Zhu, Palo Alto, CA (US); Nandakishore Mallapragada, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/069,124

(22) Filed: Oct. 13, 2020

(65) Prior Publication Data

US 2022/0116294 A1    Apr. 14, 2022

(51) Int. Cl.
*H04L 43/0817* (2022.01)
*H04L 67/10* (2022.01)
*H04W 24/02* (2009.01)

(52) U.S. Cl.
CPC .......... *H04L 43/0817* (2013.01); *H04L 67/10* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 7,415,424 B1 | 8/2008 | Donner | |
| 7,899,871 B1 | 3/2011 | Kumar et al. | |
| 8,103,726 B2 | 1/2012 | Stoddard et al. | |
| 8,135,612 B1 | 3/2012 | Scudder | |
| 9,144,082 B2 * | 9/2015 | Rubin | G08C 15/00 |
| 9,559,999 B1 | 1/2017 | Auchmoody et al. | |
| 2005/0022008 A1 | 1/2005 | Goodman et al. | |
| 2005/0085229 A1* | 4/2005 | Yamaguchi | H04L 67/2823 455/432.2 |
| 2007/0073871 A1 | 3/2007 | Adams et al. | |
| 2008/0005090 A1 | 1/2008 | Khan et al. | |
| 2012/0023174 A1 | 1/2012 | Tu | |
| 2012/0155364 A1* | 6/2012 | Kim | H04W 4/06 370/312 |
| 2013/0262590 A1 | 10/2013 | Patil et al. | |
| 2018/0145895 A1* | 5/2018 | Zhou | H04L 67/63 |
| 2020/0410450 A1 | 12/2020 | Malhotra et al. | |
| 2021/0003429 A1* | 1/2021 | Zafar | A01F 25/16 |
| 2021/0367811 A1* | 11/2021 | Tanimoto | H04L 41/12 |

FOREIGN PATENT DOCUMENTS

CN    111767167 A  *  10/2020
WO    WO-2016085456 A1 *  6/2016

* cited by examiner

*Primary Examiner* — Viet D Vu
*Assistant Examiner* — Mohammad Yousuf A. Mian
(74) *Attorney, Agent, or Firm* — Thomas Horstemeyer, LLP (57) ABSTRACT

Various examples are disclosed for edge alert coordination for mobile device alerts. An edge device can connect to a network through an edge device that monitors device data and metrics for the device. The edge device transmits a join message that includes a device identifier of the device. The edge device receives inherited device alert data. The device alert data is inherited from a previous edge device that previously monitored the device. The edge device triggers an alert using the inherited device alert data and currently monitored device data.

20 Claims, 6 Drawing Sheets

EDGE ALERT COORDINATOR FOR MOBILE DEVICES

BACKGROUND

Enterprises can manage a number of devices including phones, tablets, sensors, Internet-of-Things (IoT) devices, and other devices. These devices can connect to a network through a gateway or another edge device. Notably, typical IoT solutions evaluate data, trigger alerts, and promulgate actions at a server layer. There are many disadvantages for evaluating data, triggering alerts, performing event analysis, and determining actions at the off-premise server layer.

For instance, high and unpredictable latency may occur when transferring data to the server and evaluating the data at the server. Additionally, network bandwidth demand is increased as all data and corresponding events, actions, and related data must be transmitted over a wide area network or the Internet. This also increases computational demand at the server level. In addition, many devices are mobile in nature. This poses further challenges in alert coordination, evaluation, and triggering in modern enterprise environments.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to edge alert coordination for mobile devices. Enterprises can manage a number of devices including phones, tablets, sensors, Internet-of-Things (IoT) devices, and other devices. These devices can connect to a network through a gateway or another edge device. Many devices are mobile in nature. For example, devices can be personal devices that are carried with a user, or can be devices that include or are used with a drone or a vehicle. Devices can also be transported with goods in order to provide a state of the goods. As the devices move from location to location, they can also move from edge device to edge device.

This poses challenges in edge alert coordination, evaluation, and triggering in modern enterprise environments. For example, even if systems make alert decisions at the edge layer, the data collected from a device by a first edge device is unknown to the second edge device. This can result in a failure to report and respond to conditions associated with the managed device. However, the present disclosure describes mechanisms that enable more effective and efficient edge alert coordination for mobile devices.

Figure 1:
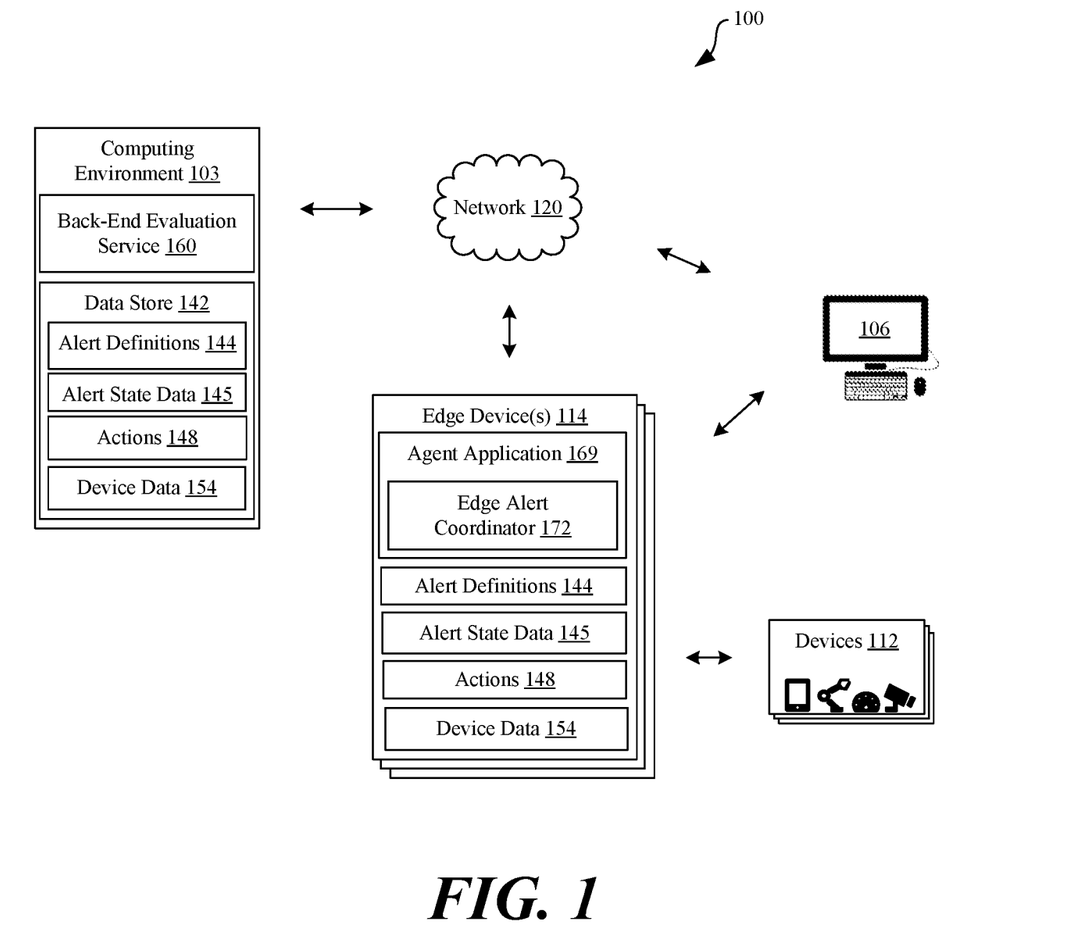
FIG. 1 is a drawing of an example of a networked environment that includes components that provide edge alert coordination.

Turning now to FIG. 1, an example of a networked environment 100 is shown. The networked environment 100 can include a computing environment 103, client devices 106, and devices 112 in communication with one other over a network 120. The network 120 can include, for example, the Internet, intranets, extranets, wide area networks (WANs), local area networks (LANs), wired networks, wireless networks, other suitable networks, or any combination of two or more such networks.

The network 120 of the networked environment 100 can include satellite networks, cable networks, Ethernet networks, telephony networks, and other types of networks. The computing environment 103 can include an enterprise computing environment that includes hundreds, or thousands of physical machines, virtual machines, and other software implemented in devices stored in racks, distributed geographically, and connected to one another through the network 120. As such, the computing environment 103 can be referred to as a distributed computing environment in some examples. It is understood that any virtual machine or virtual appliance is implemented using at least one physical device, such as a server or other computing device.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. In various examples, the servers of the computing environment 103 can include requisite physical hardware and software to create and manage virtualization infrastructure, a cloud computing environment, an off-premise environment, and/or a serverless computing environment. Also, in some examples, the physical computing resources can be used to provide virtual computing resources, such as virtual machines or other software, such as a computing service.

For purposes of convenience, the computing environment 103 is sometimes referred to herein in the singular. Even though the computing environment 103 is referred to in the singular, it is understood that a plurality of computing environments 103 can be employed in the various arrangements as described above. As the computing environment 103 communicates with the edge devices 114 and client devices 106 over the network 120, sometimes remotely, the computing environment 103 can be described as a remote computing environment 103 in some examples.

The computing environment 103 can include a data store 142, which can include one or more databases in some examples. The data store 142 can include memory of the computing environment 103, mass storage resources of the computing environment 103, or any other storage resources on which data can be stored by the computing environment 103. The data store 142 can include one or more relational databases, such as structured query language databases, non-SQL databases, or other relational or non-relational databases. The data stored in the data store 142, for example, can be associated with the operation of the various services or functional entities described below.

The data store 142 can include alert definitions 144, which can include or specify actions 148 and rules based on device data 154 such as states and sensor readings from devices 112. It also contains alert state data 145, which can refer to device data 154 that corresponds to prerequisite states, metrics, configurations, timings, and other data required to trigger an alert based on the alert definition 144.

The alert definitions 144 can further refer to predefined tasks or actions 148 that are performed in response to a set of prerequisite rules or conditions being satisfied. For instance, if a device 112 includes a camera, a user can create an alert definition 144 having a corresponding action 148 that notifies security personnel when the camera becomes non-operational or when motion has been detected.

The components executed on the computing environment 103 can include, for example, a back-end evaluation service 160, as well as other applications, services, processes, systems, engines, or functionality not discussed in detail herein. The back-end evaluation service 160 can provide an administrator console having one or more interfaces to create, read, update, or delete alert definitions 144 and associated actions 148. In some examples, the back-end evaluation service 160 includes a data point evaluator that evaluates sensor data and triggers alerts if alert definitions 144 are satisfied based on the device data 154. Further, the back-end evaluation service 160 can serve up one or more user interfaces that can be accessed by the client device 106 to read or acknowledge alerts. In the various examples described herein, various components can be deployed on a server; however, a portion of the components may also be deployed on an edge device 114, such as the alert analysis and action decision making (ADM) service and the data point evaluator.

The devices 112 can include Internet of Things (IoT) devices in IoT networks, such as objects or devices having one or more sensors thereon, such as a camera, temperature sensor, humidity sensor, microphone or audio sensor, presence sensor, or another sensor. To this end, the devices 112 can include touch sensors; physical input devices such as keypads, buttons, and switches; cameras; physical actuators, such as locks; automotive sensors, such as fuel sensors, temperature sensors, engine sensors, and tire sensors; manufacturing sensors, such as assembly line sensors; and industrial sensors, such as windmill and solar panel sensors.

Devices 112 can also include personal mobile devices such as tablets and cellular phones. The devices 112 can also include personal devices such as laptop personal computers that can be moved from place to place. The devices 112 can further include drones and vehicles, or a device carried along with a drone or a vehicle. Since the devices 112 can be moved from place to place, they can in some instances be referred to as mobile devices 112. As devices 112 move from location to location, the devices 112 can also move from edge device 114 to edge device 114. In other words, a device 112 can physically disconnect from a wired connection, disconnect from a wireless network, or move out of a range or area of a first edge device 114. The device 112 can then physically connect to a wired connection, connect to a wireless network, or move into a range or area of a second edge device 114.

Devices 112 can include hardware to communicate device data 154 to an edge device 114 located at or near the devices 112. States such as actuator positions, online statuses, device configurations, software errors, software versions, and other device data 154 can also be communicated to an edge device 114. The devices 112 can also periodically check in or announce their presence to the edge device 114. Devices 112 can communicate data to edge devices 114 through connections that utilize Bluetooth®, Zigbee®, or other suitable protocols. Devices 112 can communicate data to edge devices 114 through WiFi, WAPI, and other types of protocols.

In some examples, an edge device 114 can include an agent application 169 that oversees the operation of the edge device 114, as well as devices 112 to which the edge device 114 provides a connection to a network 120. For instance, assuming that a device 112 includes a client device 106 that should check in periodically to ensure it stays on company premises or on the campus of a company, university, college, or other enterprise. An alert definition 144 can indicate that if the device 112 does not check in for thirty minutes, a notification should be provided to an administrator. The device 112 can check in periodically with an edge device 114. However, a campus or premises can include multiple edge devices 114 providing network connectivity for the device 112 and other devices 112. A device 112 may be permitted to move from one floor to another floor, or from one building to another building. If the device 112 moves away from or otherwise disconnects from the edge device 114, the edge device 114 will not receive the check in information and can trigger a false positive alert once the time has elapsed.

If the device 112 connects to another edge device 114 in an approved location, then the timer should reset once the device 112 checks in. However, the new edge device 114 may not include the appropriate alert definition 144 for the device 112, and the previous edge device 114 can still be waiting for the device 112 to check in. To this end, each edge device 114 can execute an agent application 169 that includes an edge alert coordinator 172.

The edge alert coordinator 172 can determine that a device 112 has newly connected to the edge device 114. The edge alert coordinator 172 can then identify a device identifier that uniquely identifies the device 112, and can broadcast or transmit this information to the other edge devices 114. The edge alert coordinator 172 can also identify the edge device 114 to which the device 112 is currently connected. On receiving this information, the previous edge device 114, can return the alert definition 144 and alert state data 145 to the edge alert coordinator 172 of the current edge device 114. The alert state data 145 and alert definition 144 can be deleted from the pervious edge device 114. Even if the alert definition 144 remains, the previous edge device 114 will not trigger a false positive since the alert state data 145 is deleted, and the alert state data 145 is uninitialized with respect to the device 112.

Figure 2A:
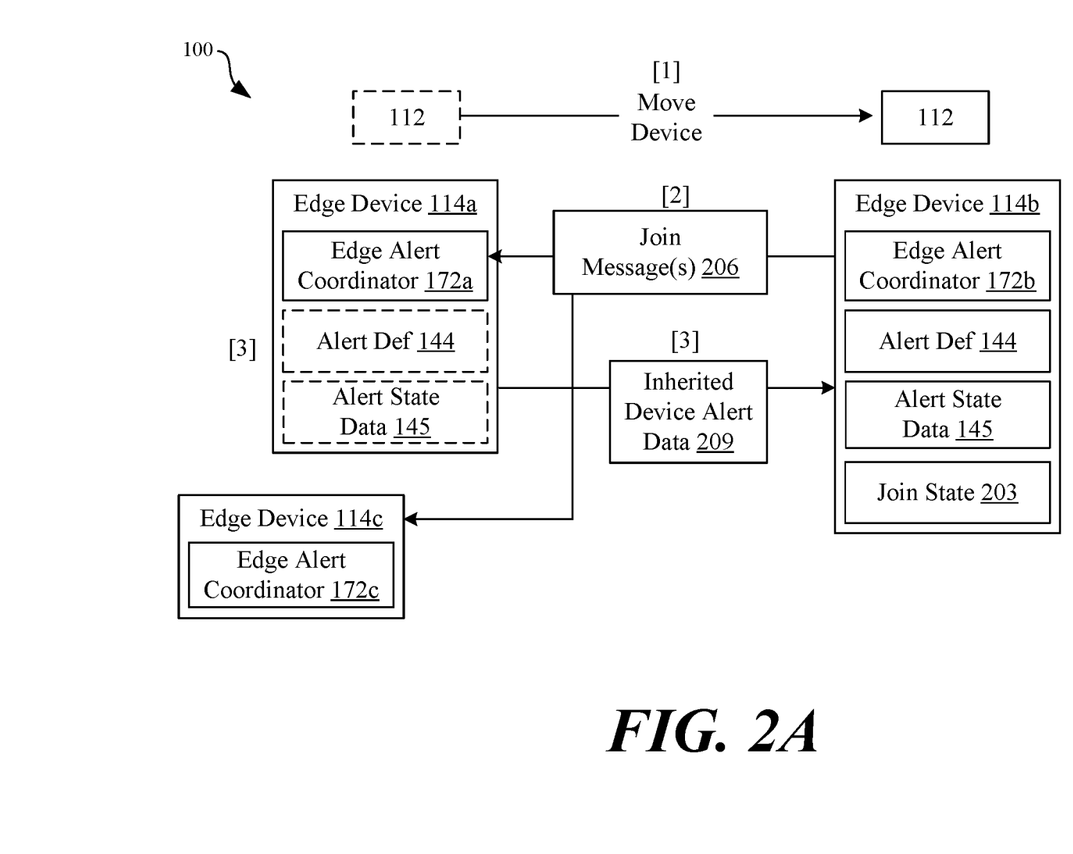
FIG. 2A is a sequenced diagram illustrating operations performed by components of the networked environment of FIG. 1 for alert coordination where edge devices communicate without a back-end service.

FIG. 2A is a sequenced diagram illustrating operations performed by components of the networked environment 100 for alert coordination without a back-end evaluation service 160. This example generally shows how the edge alert coordinators 172a and 172b provide edge alert coordination for a device 112 that is moved from edge device 114a to edge device 114b. While the diagram indicates an example sequence of events, some steps can be omitted or changed in relative order compared to the order shown.

In this case, the networked environment 100 includes edge devices 114a, 114b, and 114c. The edge device 114a can include an edge alert coordinator 172a, an alert definition 144, and alert state data 145. The alert definition 144 and the alert state data 145 can correspond to the device 112 that is initially connected to the edge device 114a.

In step one, the device 112 can move from edge device 114a to edge device 114b. This can include connecting to a network 120 through the edge device 114b. The edge alert coordinator 172b can determine that the device 112 is newly connected. The edge alert coordinator 172b can set a join state 203 for the device 112 to a temporary pending status that causes metrics and device data 154 from the device 112 to be queued and unprocessed until any alert definitions 144 and alert state data 145 are identified from previous edge devices 114.

In step two, the edge alert coordinator 172b can transmit or broadcast a join message 206 to all other edge devices 114. The join message 206 can include a unique device identifier of the device 112 such as a MAC address, a serial number, a UDID, or another identifier. The edge alert coordinator 172b can broadcast the join message 206 over a local area network or wide area network to which the edge devices 114a, 114b, and 114c are connected, such that any connected device can receive the broadcast. In other situations, the edge alert coordinator 172b can transmit the join message 206 by directly addressing the edge device 114a and edge device 114c. In some examples, an agent application executed on the device 112 can transmit an identification of the previous edge device 114a to the edge alert coordinator 172b once connected to the current edge device 114b. In this case, the edge alert coordinator 172b can transmit the join message 206 only to the specified previous edge device 114a.

In step three, the edge alert coordinator 172a can transmit inherited device alert data 209 to the edge device 114b. The inherited alert data 209 can include alert definitions 144 and alert state data 145 that corresponds to the device 112.

For example, the edge alert coordinator 172a of the edge device 114a can receive and process the join message 206. The edge alert coordinator 172a can match the identifier from the join message 206 to the alert definition 144 and the alert state data 145. The edge alert coordinator 172b can then transmit a message to the edge device 114b. This message can include inherited device alert data 209. The edge alert coordinator 172b can identify the edge device 114b based on the join message 206 or a source of the join message 206.

The edge alert coordinator 172a can also delete the alert state data 145, since the alert state data 145 can be device-specific to the device 112. In some examples, the edge alert coordinator 172a can further delete the alert definition 144, if the alert definition 144 is not associated with other devices 112 that are still connected through the edge device 114a.

The edge alert coordinator 172c of the edge device 114c can also receive the join message 206. In some cases, the edge alert coordinator 172c transmits a confirmation that the edge device 114c has no alert definition 144 or alert state data 145 corresponding to the device 112 specified in the join message 206. In other cases, the edge alert coordinator 172c takes no action if the edge device 114c has no alert definition 144 or alert state data 145 corresponding to the device 112.

Figure 2B:
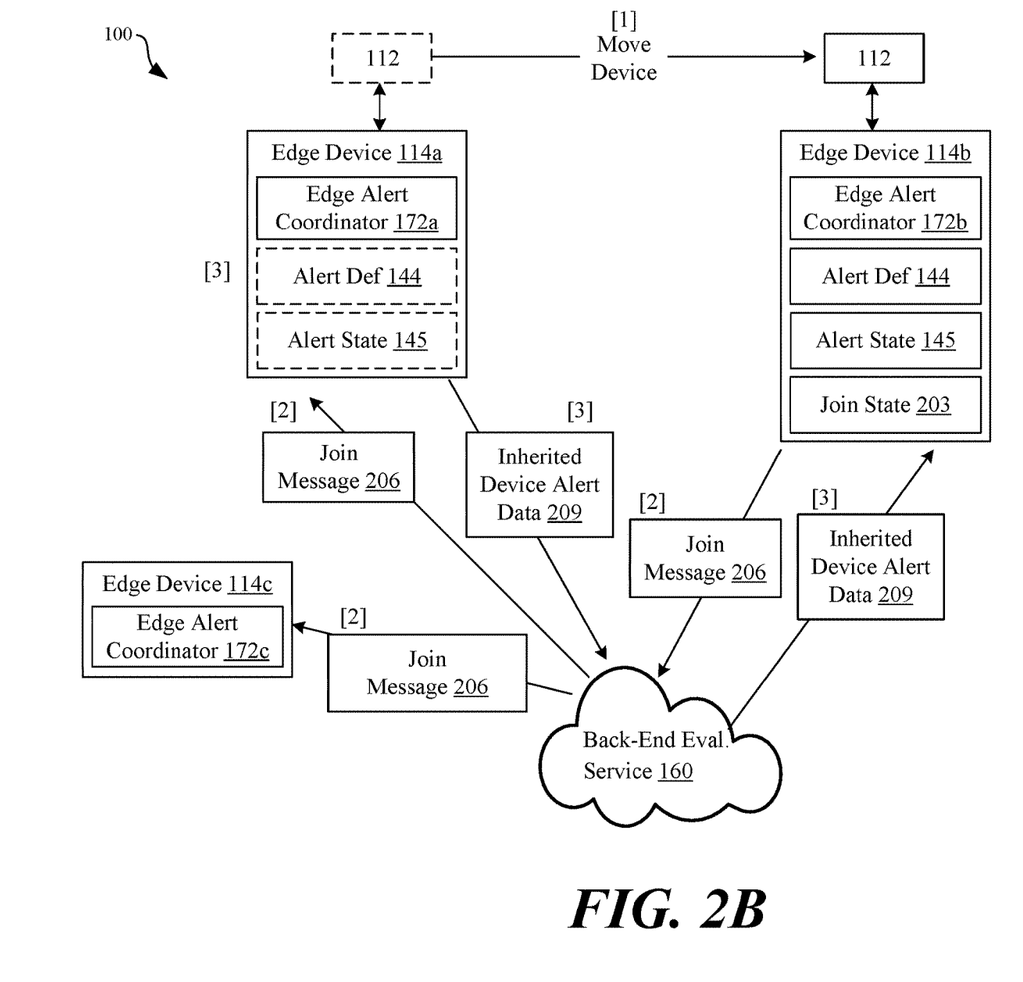
FIG. 2B is a sequenced diagram illustrating operations performed by components of the networked environment of FIG. 1 for alert coordination where edge devices communicate through a back-end service.

FIG. 2B is a sequenced diagram illustrating operations performed by components of the networked environment 100 for alert coordination with a back-end evaluation service 160. This example generally shows how the edge alert coordinators 172a and 172b provide edge alert coordination in coordination with the back-end evaluation service 160. While the diagram indicates an example sequence of events, some steps can be omitted or changed in relative order compared to the order shown.

The networked environment 100 can include edge devices 114a, 114b, and 114c. The edge device 114a can include an edge alert coordinator 172a, an alert definition 144, and alert state data 145. The alert definition 144 and the alert state data 145 can correspond to the device 112 that is initially connected to the edge device 114a.

In step one, the device 112 can move from edge device 114a to edge device 114b. This can include connecting to a network 120 through the edge device 114b. The edge alert coordinator 172b can determine that the device 112 is newly connected. The edge alert coordinator 172b can set a join state 203 for the device 112 to a temporary pending status that causes metrics and device data 154 from the device 112 to be queued and unprocessed until any alert definitions 144 and alert state data 145 is identified from previous edge devices 114.

In step two, the edge alert coordinator 172b can transmit or broadcast a join message 206 to the back-end evaluation service 160. The back-end evaluation service 160 can forward the join message 206 to a set of edge devices 114 including the edge device 114a and the edge device 114c. If an identification of the previous edge device 114a is known, the edge alert coordinator 172b can include this identification in the join message 206 or otherwise transmit it to the back-end evaluation service 160. The join message 206 can include a unique device identifier of the device 112.

In step three, the edge alert coordinator 172a can transmit inherited device alert data 209 to the back-end evaluation service 160. The inherited alert data 209 can include alert definitions 144 and alert state data 145 that corresponds to the device 112. The edge alert coordinator 172a can match the identifier from the join message 206 to the alert definition 144 and the alert state data 145. The back-end evaluation service 160 can then forward the inherited device alert data 209 to the appropriate edge device 114b.

The edge alert coordinator 172a can delete the alert state data 145, since the alert state 145 can be device-specific to the device 112. In some examples, the edge alert coordinator 172a can further delete the alert definition 144, if the alert definition 144 is not associated with other devices 112 that are still connected through the edge device 114a.

Figure 3:
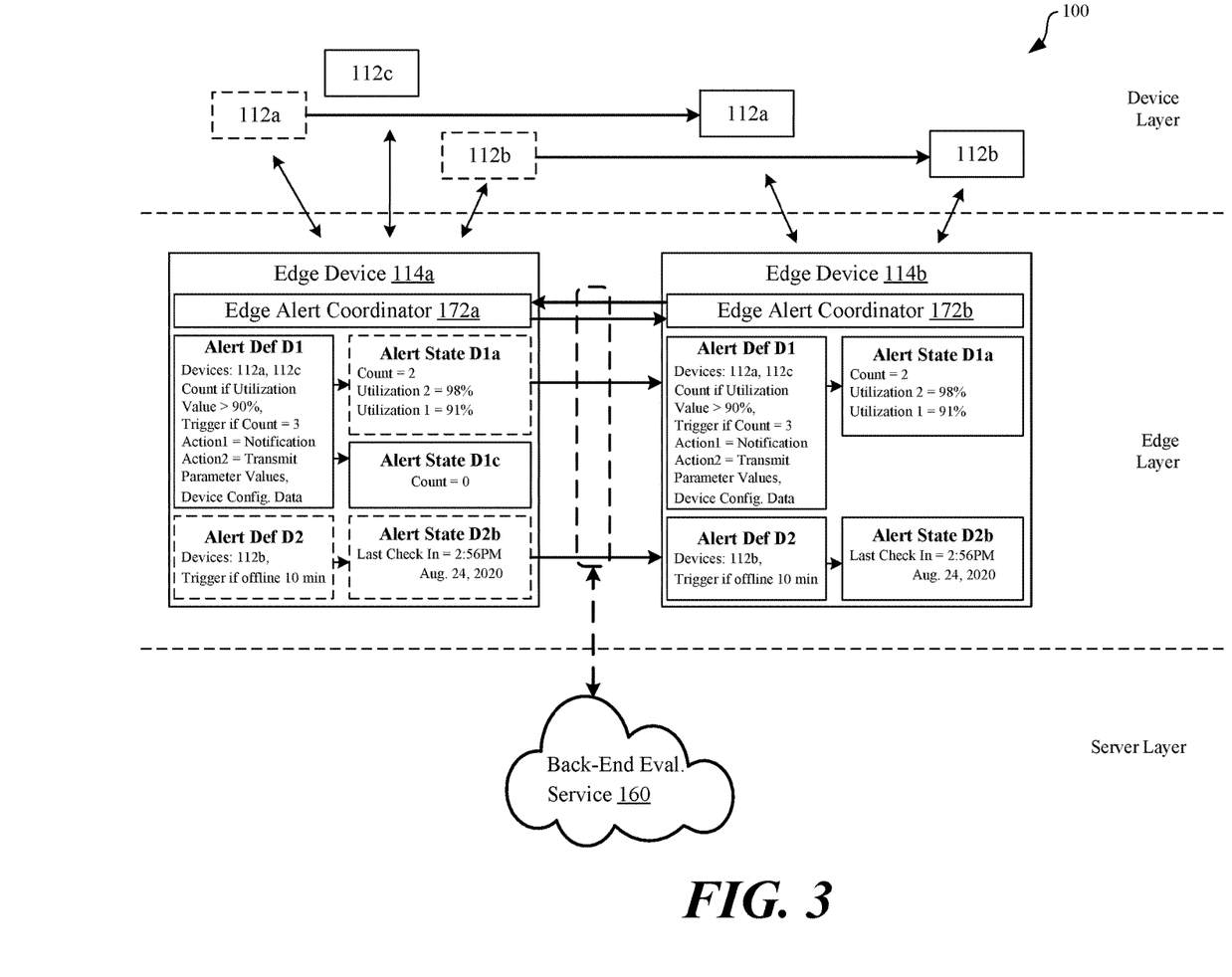
FIG. 3 is a drawing illustrating aspects of edge alert coordination in the networked environment of FIG. 1.

FIG. 3 shows aspects of edge alert coordination in the networked environment 100. Generally, FIG. 3 shows an example of how edge alert coordinators 172a and 172b interact to provide edge alert coordination for devices 112a and 112b as they move from edge device 114a to edge device 114b.

The networked environment 100 includes an edge device 114a and an edge device 114b. Initially, devices 112a, 112b, and 112c are connected through edge device 114a. The edge device 114a includes an edge alert coordinator 172a. The edge alert coordinator 172a monitors device data 154 for connected devices 112a, 112b, and 112c. The edge alert coordinator 172a can trigger alerts based on an alert definition D1 and an alert definition D2. The alert definitions D1 and D2 can refer to respective alert definitions 144 that are received from a back-end evaluation service 160 or from another administrative environment.

The alert definition D1 can specify or can be otherwise associated with devices 112a and 112c. As a result, the edge alert coordinator 172a can monitor respective device data 154 of the specified devices 112a and 112c for the prerequisite conditions indicated by alert definition D1. Alert definition D1 can include instructions to generate alert state data 145. For example, alert definition D1 can indicate to increment a counter if a utilization value is greater than 90%, and to trigger an alert once the count reaches three. The alert definition D1 can also indicate to request utilization metrics from the specified devices 112a and 112c periodically, or can include one-time instructions for the specified devices 112a and 112c to provide this information periodically. The alert definition D1 can also specify actions 148 including to transmit a notification to a specified user or account through a console of the back-end evaluation service 160, to a particular device 106, or to a particular email address. The actions 148 can further indicate to transmit time-stamped parameter values such as the utilization parameters, device configuration data, and other information to the back-end evaluation service 160. This information can be provided in the notification, or through a user interface of the back-end evaluation service 160. A link to the user interface can be included in the notification.

The alert definition D2 can specify or can be otherwise associated with device 112b. As a result, the edge alert coordinator 172a can monitor respective device data 154 of the specified devices 112b for the prerequisite conditions indicated by alert definition D2. Alert definition D2 can include instructions to generate alert state data 145. For example, alert definition D2 can indicate to store a most recent check-in time, and to trigger an alert if the last check-in time is a threshold time period from a current time tracked by the edge device 114a.

The edge alert coordinator 172a can generate alert states D1a, D1c, and D2b based on an analysis of device data 154 received from the devices 112a, 112b, and 112c according to alert definitions D1 and D2. The edge alert coordinator 172a can generate and store the alert state D1a, which can be alert state data 145 for the alert definition D1 and device 112a. The edge alert coordinator 172a can generate and store the alert state D1c, which can be alert state data 145 for the alert definition D1 and device 112c. The edge alert coordinator 172a can also generate and store the alert state D2b, which can be alert state data 145 for the alert definition D2 and device 112b.

The devices 112a and 112b can move from the edge device 114a to the edge device 114b. A user can move the devices, and they can move along with vehicles or drones. In some cases, the devices 112a and 112b are preconfigured to automatically connect to wireless networks in an area of the edge device 114a and 114b. Once the devices 112a and 112b move out of the area or range of edge device 114a, they can be considered disconnected from the edge device 114a. However, the edge device 114a can in some cases lack knowledge that the devices 112a and 112b have moved out of its area and are no longer connected. Once the devices 112a and 112b move into the area or range of edge device 114b, they can automatically connect to a wireless network provided by the edge device 114b. The edge device 114b can include a list of connected devices.

The edge alert coordinator 172b can determine that the devices 112a and 112b are newly connected. For example, the edge alert coordinator 172b can identify or intercept the initial communication that connects each of the devices 112a and 112b through the edge device 114b. Alternatively, the edge alert coordinator 172b can compare a previous connected device list of the edge device 114b to a current connected device list to identify that the devices 112a and 112b are newly connected.

The edge alert coordinator 172b can transmit or broadcast a connection message or a join message 206 indicating that the devices 112a and 112b have connected through the edge device 114b. The edge alert coordinator 172b can transmit individual join messages 206 for each of the devices 112a and 112b, or a combined join message 206 for both of the devices 112a and 112b. The join message 206 can include unique device identifiers for the devices 112a and 112b, as well as an indication of the edge device 114b to which they are connected. If the edge device 114b can directly address or communicate with other edge devices 114 without Internet communications, the join message 206 can be transmitted from the edge device 114b to other edge devices 114 including the edge device 114a. If the edge device 114b is unable to directly address or communicate with other edge devices 114 without Internet communications, then the join message 206 can be relayed through the back-end evaluation service 160. The back-end evaluation service 160 can be an Internet, cloud, WAN, or other server-layer service that all edge devices 114 can communicate with.

The edge alert coordinator 172a can receive the join message 206 and check whether the edge device 114a includes alert definitions 144 and alert state data 145 that correspond to the specified devices 112a and 112b. The edge alert coordinator 172a can identify that alert definition D1, alert definition D2, alert state D1a, and alert state D2b correspond to the devices 112a and 112b. The edge alert coordinator 172a can then transmit the alert definition D1, alert definition D2, alert state D1a, and alert state D2b to the edge device 114b. The edge alert coordinator 172a can then delete or remove the alert states D1a and D2b from the edge device 114a.

The edge alert coordinator 172a can also determine whether the alert definitions D1 and D2 should be deleted from the edge device 114a. The edge alert coordinator 172a can delete an alert definition if all devices specified by the alert definition are no longer connected to the edge device 114a. Since the device 112c is still connected to the edge device 114a, the edge alert coordinator 172a does not delete the alert definition D1. In contrast, the alert definition D2 can be deleted because device 112b is the only device specified in the alert definition D2 and not connected to the edge device 114a. A corresponding process can be followed for an individual join message 206 that includes a single identifier of an individual device 112. Otherwise, the edge alert coordinator 172a can determine that the alert definition D1 specifies at least one device 112 that is connected to the edge device 114a.

The edge alert coordinator 172b can receive the alert definition D1, alert definition D2, alert state D1a, and alert state D2b. This can be referred to as inherited alert data since it is inherited from the previous edge device 114a. The edge alert coordinator 172b can then monitor the device data 154 and provide continuous and accurate monitoring of the alert definitions in view of inherited information.

Figure 4:
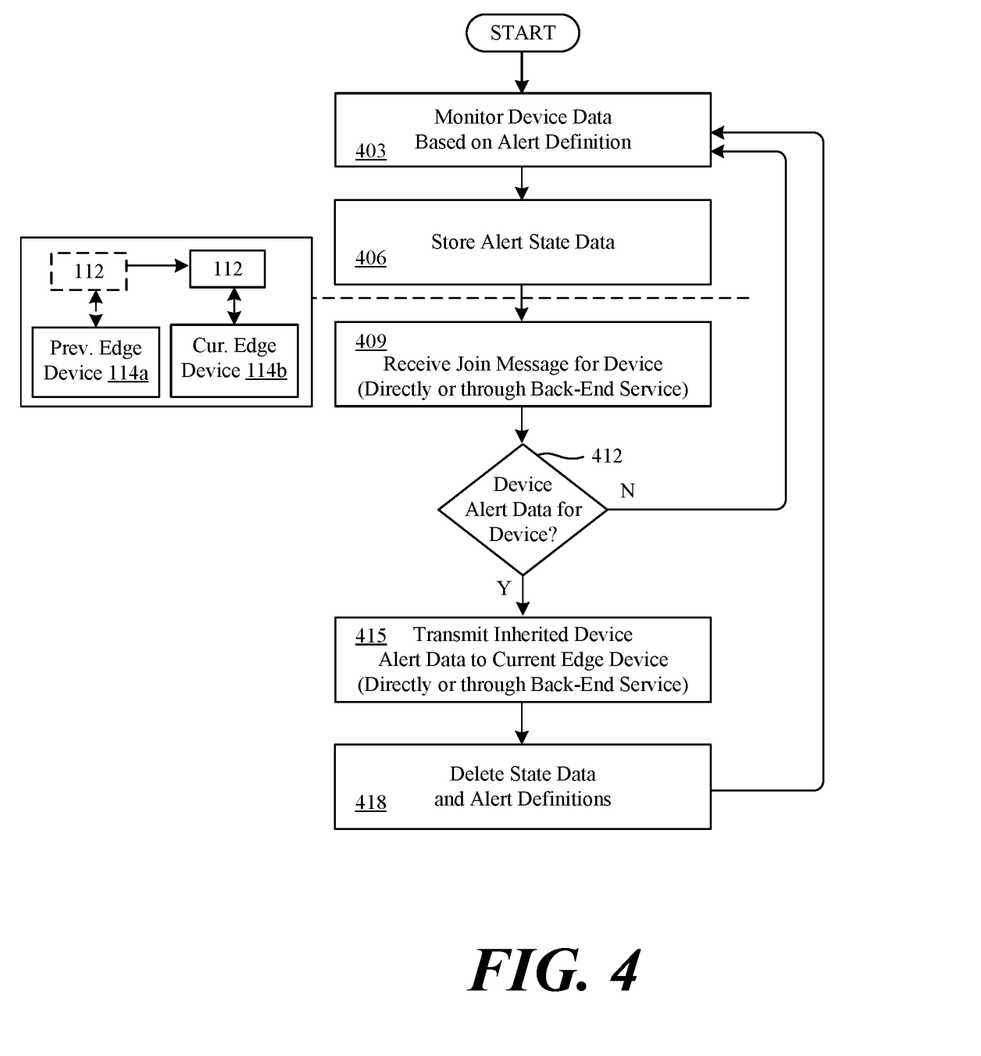
FIG. 4 is a flowchart illustrating functionality implemented by components of the networked environment of FIG. 1 for edge alert coordination.

FIG. 4 is a flowchart illustrating functionality implemented by components of the networked environment 100 for edge alert coordination. Generally, the flowchart of FIG. 4 shows how an edge alert coordinator 172 of a edge device 114a can provide inherited device alert data 209 to a current edge device 114b of the device 112. The separation or segmentation of functionality as discussed herein is presented for illustrative purposes only.

In step 403, the edge alert coordinator 172 can monitor device data 154 based on an alert definition 144. The edge alert coordinator 172 monitors device data 154 from the devices 112. The edge alert coordinator 172 can trigger alerts based on an alert definition 144.

The alert definition 144 can specify the device 112, so that the edge alert coordinator 172 can monitor the appropriate device 112 for the prerequisite conditions and states required to trigger an alert.

In step 406, the edge alert coordinator 172 can store alert state data 145. The alert data 145 can include prerequisite states and conditions required to trigger an alert defined by the alert definition 144. The alert state data 145 can specify the device 112 and can be device-specific with respect to the device 112.

The device 112 can be relocated and can connect to an edge device 114b. The edge alert coordinator 172 discussed in this flowchart is executed on the edge device 114a. Edge device 114a can be referred to as a "previous" edge device 114a of the device 112, while edge device 114b is the "current" edge device 114b through which the device 112 is connected. However, the edge coordinator 172 can be unaware that the device 112 has moved, as the device 112 can lack any requirement to announce its departure from the area.

In step 409, the edge alert coordinator 172 can receive a join message 206 for a device 112. The join message 206 can specify the device 112 using a unique device identifier of the device 112. The join message 206 can also specify a device identifier, address, or another identifier of the current edge device 114b.

In step 412, the edge alert coordinator 172 can determine whether the edge device 114 has device alert data associated with the device 112. This device alert data can be referred to as inherited device alert data 209 because the current edge device 114b inherits the data from the previous edge device 114a. The edge alert coordinator 172 can compare the device identifier received in the join message 206 to the alert definitions 144 and alert states 145 stored in a data store 142 of the edge device 114a. If edge alert coordinator 172 identifies alert definitions 144 and alert state data 145 that correspond to the specified device 112, the process can move to step 415. Otherwise, the edge alert coordinator 172 can continue to monitor device data 154 based on various alert definitions 144.

In step 415, the edge alert coordinator 172 can transmit inherited device alert data 209 to the current edge device 114b. For example, the edge alert coordinator 172 can identify as set of alert definitions 144 and alert state data 145 that correspond to the device or devices 112 identified in the join message 206. The inherited device alert data 209 can include this set of alert definitions 144 and alert states 145.

In step 418, the edge alert coordinator 172 can delete state data 145 and alert definitions 144. The alert state data 145 can be device-specific to the device 112, so the edge alert coordinator 172 can delete the state data 145. This can save storage as well as prevent false positive alerts. However, in some cases an alert definition 144 can be used for more than one device 112. If the alert definition 144 are used for additional devices 112 that are still connected to the edge device 114a, then the alert definition is not deleted.

Figure 5:
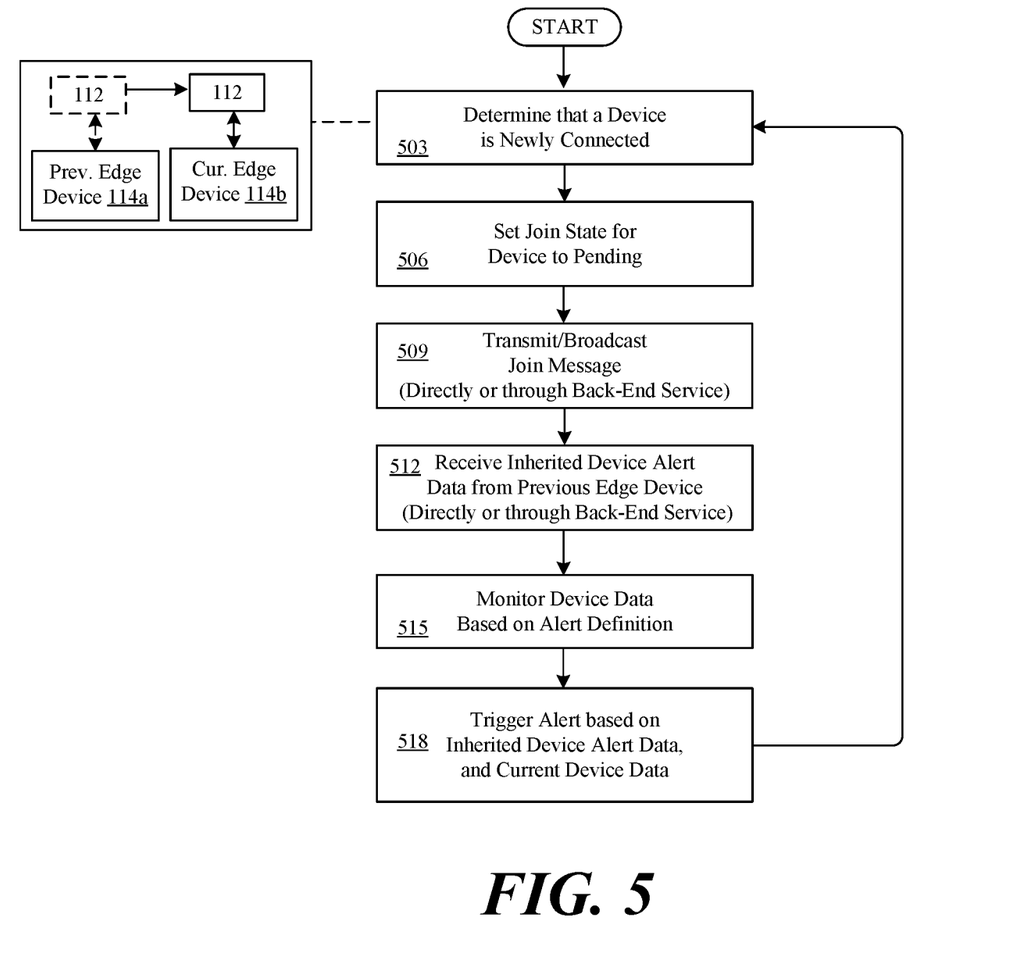
FIG. 5 is another flowchart illustrating functionality implemented by components of the networked environment of FIG. 1 for edge alert coordination.

FIG. 5 is a flowchart illustrating functionality implemented by components of the networked environment 100 for edge alert coordination. Generally, the flowchart of FIG. 5 shows how an edge alert coordinator 172 of a current edge device 114b can coordinate with other edge devices to obtain inherited device alert data from a previous edge device 114a of a device 112. The separation or segmentation of functionality as discussed herein is presented for illustrative purposes only.

In step 503, the edge alert coordinator 172 can determine that a device 112 is newly connected. For example, the edge alert coordinator 172 can compare a previous list of devices 112 to a current list of devices. If the current list of devices includes a device 112 that is not specified in the previous version, then the edge alert coordinator 172 can determine that the device 112 is newly connected.

In step 506, the edge alert coordinator 172 can set a join state 203 to a pending status. The join state 203 can be set to a temporary pending status that expires and updates after a predetermined threshold period of time. The pending status can also be updated once inherited device alert data 209 is received. This can allow the edge alert coordinator 172 time to identify appropriate alert definitions 144 and alert state data 145 if available. Any device data 154 received by the current edge device 114b can be queued by the edge alert coordinator 172 and left unprocessed until the pending status is updated.

In step 509, the edge alert coordinator 172 can transmit or broadcast a join message 206. The join message 206 can include an identifier of the device 112 that has newly connected. The join message 206 can also include a network address or another identifier of the current edge device 114b. The identifier of the device 112 can enable other edge devices 114, including the previous edge device 114a, to identify whether they include relevant alert definitions 144 and alert state data 145. The identifier of the current edge device 114b can enable the previous edge device 114a to provide the alert definitions 144 and alert state data 145 to the current edge device 114b. This process is described further with respect to FIG. 4.

In step 512, the edge alert coordinator 172 can receive inherited device alert data 209 from the previous edge device 114a. The inherited device alert data 209 can include inherited alert definitions 144 and inherited alert state data 145 that the previous edge device 114a identifies based on the identifier of the device 112. The previous edge device 114a can identify the inherited alert state data 145 based on device data 154 transmitted to the previous edge device 114a. The edge alert coordinator 172 can store inherited alert definitions 144 and inherited alert state data 145 in a data store of the current edge device 114b.

In step 515, the edge alert coordinator 172 can monitor device data 154 in view of the alert definition 144. Rather than initializing a default or new alert state for the alert definition 144, the inherited alert state data 145 can be utilized. This coordinated approach to edge alert processing enables more accurate tracking of device data 154 and alert state data 145 as compared to previous approaches. The edge alert coordinator 172 can update the join state 203 for the device 112 to remove the pending status. In some cases, the join state 203 for the device 112 can be updated to include a monitored status.

In step 518, the edge alert coordinator 172 can trigger an alert based on the inherited device alert data 209 and current device data 154. Current device data 154 can be received from the device 112 by the current edge device 114b. The edge alert coordinator 172 can process the current device data 154 according to the alert definition 144 and the inherited alert state data 145. The edge alert coordinator 172 can also identify actions 148 to perform in response to the alert being triggered. The edge alert coordinator 172 can transmit commands to the device 112 to perform an action 148 such as powering off, restarting, providing device 112 hardware and software configurations, and terminating a process. The edge alert coordinator 172 can also transmit a notification of the alert to an email address or a network endpoint of the back-end evaluation service 160. The notification can include information regarding the alert, the alert definition 144, the alert state data 145, device 112 hardware and software configurations, and other data.

Stored in the device memory are both data and several components that are executable by the processor. Also stored in the memory can be a data store and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 106 can be used to access user interfaces generated to configure or otherwise interact with the computing environment 103. These client devices 106 can include a display upon which a user interface generated by a client application for providing a virtual desktop session (or other session) can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

Sequence diagrams and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although sequence diagrams and flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

Therefore, the following is claimed:

1. A system, comprising:
    at least one computing device; and
    program instructions stored in at least one memory of the
        at least one computing device, wherein the instructions, when executed by at least one processor, cause the at least one computing device to at least:

receive, by an edge device, from a device connected to a network through the edge device, an identifier of a previous edge device through which the device previously connected;

store, by the edge device, a pending status in association with the device, wherein the pending status causes the edge device to queue device data received from the device until inherited device alert data is received from the previous edge device;

monitor, by the edge device, the device data received from the device, wherein the edge device queues the device data based at least in part on the pending status;

transmit, by the edge device, at least one join message that indicates the device has connected to the network, and comprises a device identifier of the device;

receive, by the edge device, the inherited device alert data inherited from the previous edge device, wherein the inherited device alert data comprises an alert-prerequisite device state monitored by the previous edge device based on an alert definition that specifies a plurality of alert-prerequisite device states; and trigger an alert corresponding to the alert definition based on the plurality of alert-prerequisite device states, the plurality of alert-prerequisite device states comprising: the alert-prerequisite device state monitored by the previous edge device, and the device data monitored by the edge device.

2. The system of claim 1, wherein the instructions, when executed by the at least one processor, cause the at least one computing device to at least:

transmit, by the edge device to the previous edge device, the at least one join message exclusively to the previous edge device identified by the device.

3. The system of claim 1, wherein the previous edge device deletes the alert definition and the alert-prerequisite device state based at least in part on receiving the at least one join message from the edge device.

4. The system of claim 3, wherein the edge device is unable to directly communicate with the previous edge device and the at least one join message is relayed through a back-end evaluation service.

5. The system of claim 3, wherein the inherited device alert data is received from a back-end evaluation service.

6. The system of claim 1, wherein the inherited device alert data comprises: at least one alert definition for the device, and inherited alert state data for the device.

7. The system of claim 1, wherein the at least one join message comprises an identifier of the edge device.

8. A method, comprising:

receiving, by an edge device from, a device connected to a network through the edge device, an identifier of a previous edge device through which the device previously connected;

storing, by the edge device, a pending status in association with the device, wherein the pending status causes the edge device to queue device data received from the device until inherited device alert data is received from the previous edge device;

monitoring, by the edge device, the device data received directly from the device, wherein the edge device queues the device data based at least in part on the pending status;

transmitting, by the edge device, at least one join message that indicates the device has connected to the network, and comprises a device identifier of the device;

receiving, by the edge device, the inherited device alert data inherited from the previous edge device, wherein the inherited device alert data comprises an alert-prerequisite device state monitored by the previous edge device based on an alert definition that specifies a plurality of alert-prerequisite device states; and triggering an alert corresponding to the alert definition based on the plurality of alert-prerequisite device states, the plurality of alert-prerequisite device states comprising: the alert-prerequisite device state monitored by the previous edge device, and the device data monitored by the edge device.

9. The method of claim 8, further comprising:

transmitting, by the edge device to the previous edge device, the at least one join message exclusively to the previous edge device identified by the device.

10. The method of claim 8, wherein the previous edge device deletes the alert definition and the alert-prerequisite device state based at least in part on receiving the at least one join message from the edge device.

11. The method of claim 10, wherein the edge device is unable to directly communicate with the previous edge device and the at least one join message is relayed through a back-end evaluation service.

12. The method of claim 10, wherein the inherited device alert data is received from a back-end evaluation service.

13. The method of claim 8, wherein the inherited device alert data comprises: at least one alert definition for the device, and inherited alert state data for the device.

14. The method of claim 8, wherein the at least one join message comprises an identifier of the edge device.

15. A non-transitory computer-readable medium comprising program instructions that when executed by at least one processor, cause at least one computing device to at least:

receive, by an edge device from, a device connected to a network through the edge device, an identifier of a previous edge device through which the device previously connected;

store, by the edge device, a pending status in association with the device, wherein the pending status causes the edge device to queue device data received from the device until inherited device alert data is received from the previous edge device;

monitor, by the edge device, the device data received from the device, wherein the edge device queues the device data based at least in part on the pending status;

transmit, by the edge device, at least one join message that indicates the device has connected to the network, and comprises a device identifier of the device;

receive, by the edge device, the inherited device alert data inherited from the previous edge device, wherein the inherited device alert data comprises an alert-prerequisite device state monitored by the previous edge device based on an alert definition that specifies a plurality of alert-prerequisite device states; and trigger an alert corresponding to the alert definition based on the plurality of alert-prerequisite device states, the plurality of alert-prerequisite device states comprising: the alert-prerequisite device state monitored by the previous edge device, and the device data monitored by the edge device.

16. The non-transitory computer-readable medium of claim 15, wherein the instructions, when executed by the at least one processor, cause the at least one computing device to at least:
   transmit, by the edge device to the previous edge device, the at least one join message exclusively to the previous edge device identified by the device.

17. The non-transitory computer-readable medium of claim 15, wherein the previous edge device deletes the alert definition and the alert-prerequisite device state based at least in part on receiving the at least one join message from the edge device.

18. The non-transitory computer-readable medium of claim 17, wherein the edge device is unable to directly communicate with the previous edge device and the at least one join message is relayed through a back-end evaluation service.

19. The non-transitory computer-readable medium of claim 17, wherein the inherited device alert data is received from a back-end evaluation service.

20. The non-transitory computer-readable medium of claim 15, wherein the inherited device alert data comprises: at least one alert definition for the device, and inherited alert state data for the device.

* * * * *